United States Patent
Busick et al.

[11] Patent Number: 5,853,013
[45] Date of Patent: Dec. 29, 1998

[54] PRE-WASH APPARATUS FOR RECYCLING HEAVILY CONTAMINATED POLYMER TUBING

[75] Inventors: Lon D. Busick, Stuttgart, Ak.; Billy Marlow, Ruleville, Miss.

[73] Assignee: Delta Plastics of the South LLC, Stuttgart, Ak.

[21] Appl. No.: 811,015

[22] Filed: Mar. 4, 1997

[51] Int. Cl.$^6$ .................................................. B08B 3/00
[52] U.S. Cl. ............................. 134/63; 134/65; 134/67; 134/68; 134/72; 134/73; 134/74; 134/104.4; 134/115 R
[58] Field of Search ................................ 134/63, 65, 66, 134/67, 68, 72, 73, 74, 104.4, 115 R, 132

[56] References Cited

U.S. PATENT DOCUMENTS

| | | | |
|---|---|---|---|
| 1,422,309 | 7/1922 | Schweinsberg et al. | 134/65 |
| 2,505,371 | 4/1950 | Teppe | 134/132 |
| 3,683,945 | 8/1972 | Weisser | 134/68 |
| 4,196,019 | 4/1980 | Kohler et al. | 134/104.4 X |
| 5,137,042 | 8/1992 | Jou | 134/65 |
| 5,165,432 | 11/1992 | McKibben | 134/65 |
| 5,185,041 | 2/1993 | Anderson et al. | 134/65 X |
| 5,341,826 | 8/1994 | Huber et al. | 134/132 X |
| 5,635,224 | 6/1997 | Brooks | 425/202 |

FOREIGN PATENT DOCUMENTS

| | | | |
|---|---|---|---|
| 4125164 | 2/1992 | Germany | 134/104.4 |

Primary Examiner—Philip R. Coe
Attorney, Agent, or Firm—Jeffrey L. Thompson; Thompson & Thompson, P.A.

[57] ABSTRACT

A pre-wash process and apparatus for recycling polymer tubing contaminated with large amounts of organic matter, soil, and so forth. The pre-wash process includes the steps of sizing the contaminated polymer tubing into small pieces, conveying the polymer tubing on a first conveyor into a rotating wash trommel, washing the polymer tubing in the rotating wash trommel, conveying the polymer tubing on a second conveyor through a pre-rinse stage and then into a rotating rinse trommel, rinsing the polymer tubing in the rinse trommel, discharging the polymer tubing from the rinse trommel into a float/sink tank, passing the polymer tubing through the float/sink tank to a third conveyor, and conveying the polymer tubing into a suitable container for delivery to a final wash and pelletizing process. The wash trommel and rinse trommel each comprises a rotating cylinder with internal helical flighting that causes intense rolling and agitation of the polymer tubing. The rinse trommel is perforated so that fluid and contaminants are separated from the polymer material. The conveyors are made of chain mesh or other suitable open structure. Linear motion shaker screens are placed below the second conveyor and the rinse trommel to separate contaminants from the recirculated wash and rinse fluids, respectively.

13 Claims, 8 Drawing Sheets

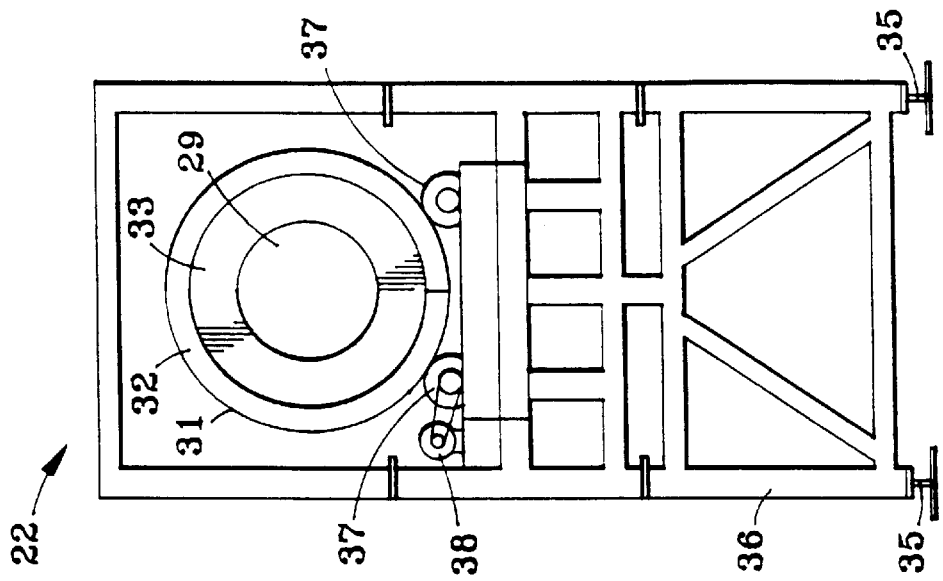
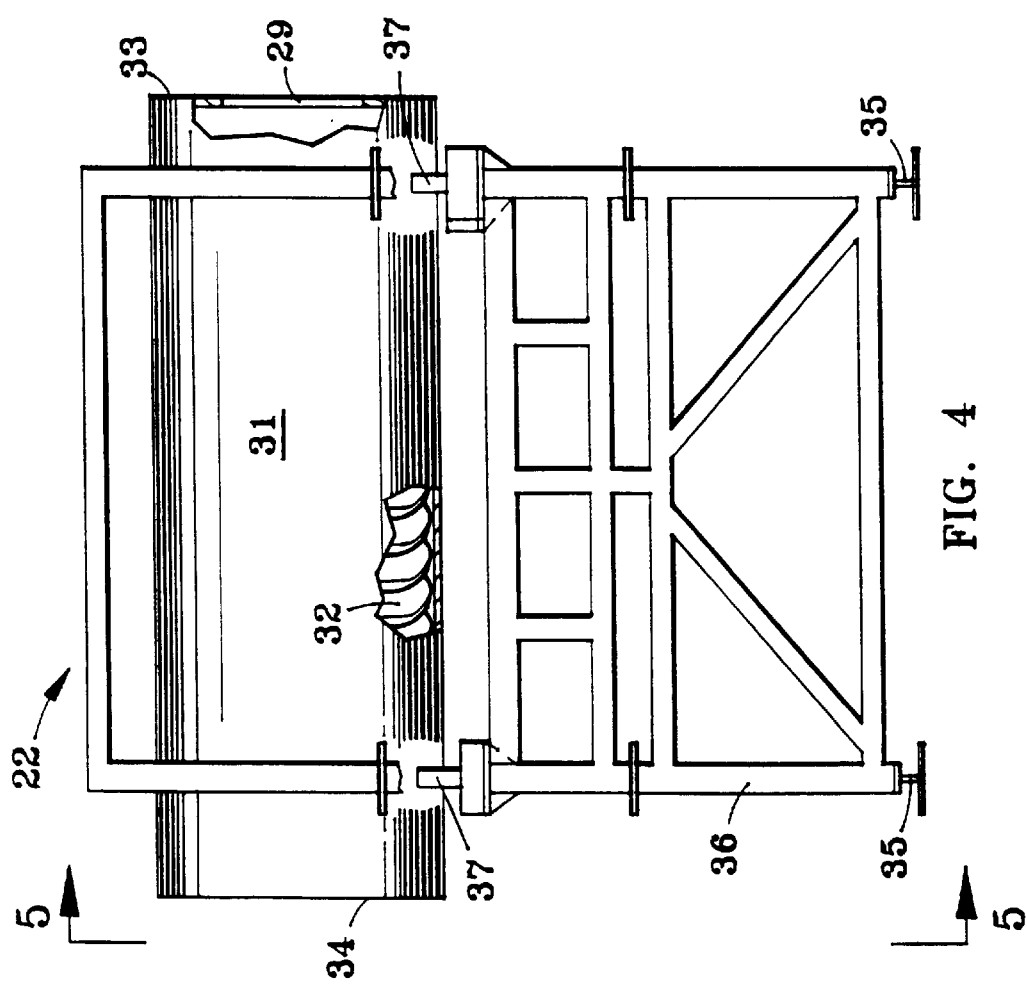

PRE-WASH APPARATUS FOR RECYCLING HEAVILY CONTAMINATED POLYMER TUBING

BACKGROUND OF THE INVENTION

1. Field of the Invention

The present invention relates generally to washing and recycling processes and, in particular, to a pre-wash process and apparatus for recycling polymer tubing contaminated with large amounts of organic matter, soil, and so forth.

2. Description of the Related Art

The use of flexible tubing, such as tubing made of low density polyethylene (LDPE), has increased in recent years. Farmers have recognized that such flexible tubing provides a low cost alternative for furrow irrigating row crops. Flexible polymer tubing can be purchased at a fraction of the cost of rigid irrigation pipe made of materials such as PVC or aluminum. However, the flexible polymer tubing can generally only be used for one irrigation season. The useful life span of the polymer tubing is limited because the tubing is easily damaged during use, and because the tubing becomes filled with large amounts of organic matter and sediment during an irrigation season that makes it difficult or impossible to roll up, transport, and store.

The increased use of flexible polymer tubing has created a significant environmental problem because the discarded polymer tubing has been building up in fields and on farms. Land fills often refuse to accept the polymer tubing since it is not bio-degradable. As a result, farmers have been burying or burning the used polymer tubing to dispose of the tubing. However, burning and burying the used tubing is fraught with environmental concerns and is even illegal in some areas.

A number of attempts have been made at recovering the used polymer tubing by recycling the tubing. However, these attempts have generally failed because the used tubing is usually so contaminated (e.g., over 50% by weight) with sediment, sticks, plants, animals, fish, and all sorts of other garbage, that the polymer tubing has been seen as being impossible, or at least unfeasible, to recycle.

Before developing the present invention, the applicants built a plant to recycle used polymer tubing into new tubing for irrigation. The plant used a process of washing the polymer material with a small float sink tank, a slurry tank, and a hot water wash, before passing the polymer material to other conventional recycling processes. The applicants then brought in large amounts (several millions pounds) of used polymer tubing to run through the recycling plant, which tubing was readily available from local farmers, merchants, landfills, and so forth. However, when the applicants began operating the recycling plant, they were forced to immediately shut down the plant because the polymer tubing was so contaminated that it could not be adequately washed by the wash processes built into the plant. In fact, the applicants could not find any existing wash processes that were suitable for removing large enough amounts of contaminants from the polymer tubing that would permit the plant to continue operation.

Thus, it was discovered that there was a need in the art for an improved wash process for recycling heavily contaminated polymer tubing.

SUMMARY OF THE INVENTION

An object of the present invention is to provide a wash process and apparatus for washing heavily contaminated flexible polymer tubing.

A further object of the present invention is to provide a wash process and apparatus for removing large amounts of organic matter, soil, and other foreign material from heavily contaminated flexible polymer tubing before introducing the tubing into a final wash and recycling process.

A still further object of the present invention is to provide a wash process and apparatus that permits recycling heavily contaminated flexible polymer tubing while minimizing the amount of water and energy used.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with a first aspect of the present invention, a pre-wash process for recycling heavily contaminated polymer tubing is provided, comprising the steps of: washing the polymer tubing in a rotating wash trommel; conveying the polymer tubing from the rotating wash trommel through a pre-rinse spray and into a rotating rinse trommel; rinsing the polymer tubing in the rotating rinse trommel; passing the polymer tubing through a float/sink tank; and conveying the pre-washed tubing to a container for transport to a final wash and pelletizing process.

In accordance with a second aspect of the present invention, a pre-wash apparatus is provided for pre-washing heavily contaminated polymer tubing for recycling. The pre-wash apparatus according to this aspect of the present invention comprises: a wash trommel having a generally horizontal axis of rotation and a helical flighting on an inside surface thereof; a rinse trommel having a generally horizontal axis of rotation and a helical flighting on an inside surface thereof, the rinse trommel having a perforated wall surface that allows rinse fluid and contaminants to pass therethrough; and a conveyor positioned between a discharge end of the wash trommel and an entrance end of the rinse trommel for conveying the polymer tubing from the wash trommel to the rinse trommel.

The pre-wash apparatus according to the present invention also preferably comprises the following additional features. A guillotine or the like is provided for sizing the polymer tubing into small pieces before introducing the polymer tubing into the wash trommel. A first open mesh conveyor is provided for conveying the sized polymer tubing from a loading point to an entrance end of the wash trommel. A trough is positioned between a discharge end of the first open mesh conveyor and the entrance end of the wash trommel. The trough has a continuous flow of wash fluid flowing therethrough for conveying the polymer tubing along with the wash fluid into the entrance end of the wash trommel.

The conveyor positioned between the wash trommel and the rinse trommel preferably comprises a second open mesh conveyor. A first spray bar is positioned above the second open mesh conveyor for spraying a pre-rinse fluid over the polymer tubing. A first funnel-shaped structure is positioned below the second open mesh conveyor for guiding fluid and contaminants passing through the second open mesh conveyor to a first separating means for separating the contaminants from the fluid. A first means is provided for recirculating the fluid passing through the first separating means back into at least one of the wash trommel and the first spray bar.

A second spray bar extends into the rinse trommel for spraying rinse fluid over the polymer tubing within the rinse trommel. A second funnel-shaped structure is positioned below the rinse trommel for guiding fluid and contaminants passing through the perforated wall surface of the rinse trommel to a second separating means for separating the contaminants from the fluid. A second means is provided for recirculating the fluid passing through the second separating means back through the second spray bar and into the rinse trommel.

A float/sink tank is provided having an entrance end adjacent to a discharge end of the rinse trommel. The float/sink tank has a fluid level therein sufficient to permit the polymer tubing to float from the entrance end of the tank to a discharge end thereof while permitting contaminants separated from the polymer tubing to sink to a bottom of the tank. A third open mesh conveyor is positioned at the discharge end of the float/sink tank for conveying the polymer tubing away from the float/sink tank. A means is provided for spraying a final rinse fluid onto the polymer tubing being conveyed on the third open mesh conveyor. A third means is provided for recirculating fluid passing through the third open mesh conveyor back into the entrance end of the float/sink tank.

At least one recirculating tank is provided for receiving fluid from the first and second separating means, and at least one pump is provided for pumping fluid from the recirculating tank back into the wash trommel, the first spray bar, and the second spray bar. A two stage reservoir is in fluid communication with the recirculating tank for supplying make-up fluid thereto and for receiving contaminated fluid therefrom.

In accordance with a third aspect of the present invention, a process of recycling heavily contaminated polymer tubing used for agricultural irrigation is provided. The recycling process according to this aspect of the invention comprises the steps of: supplying heavily contaminated polymer tubing to a pre-wash process; pre-washing the polymer tubing by washing the polymer tubing in a rotating wash trommel, conveying the polymer tubing from the rotating wash trommel to a rotating rinse trommel, and rinsing the polymer tubing in the rotating rinse trommel; subjecting the pre-washed polymer tubing to a final wash and pelletizing process to produce polymer pellets; and fabricating new polymer tubing for agricultural irrigation using the polymer pellets.

BRIEF DESCRIPTION OF THE DRAWINGS

The present invention will become more clearly appreciated as the disclosure of the invention is made with reference to the accompanying drawings. In the drawings:

FIG. 4 is a side view of a wash trommel for use in the pre-wash apparatus of the present invention.

FIG. 5 is an end view of the wash trommel taken along line 5—5 in FIG. 4.

DETAILED DESCRIPTION OF THE PREFERRED EMBODIMENT

A preferred embodiment of the present invention will now be described, by way of example, with reference to the accompanying FIGS. 1 to 9.

Figure 1:
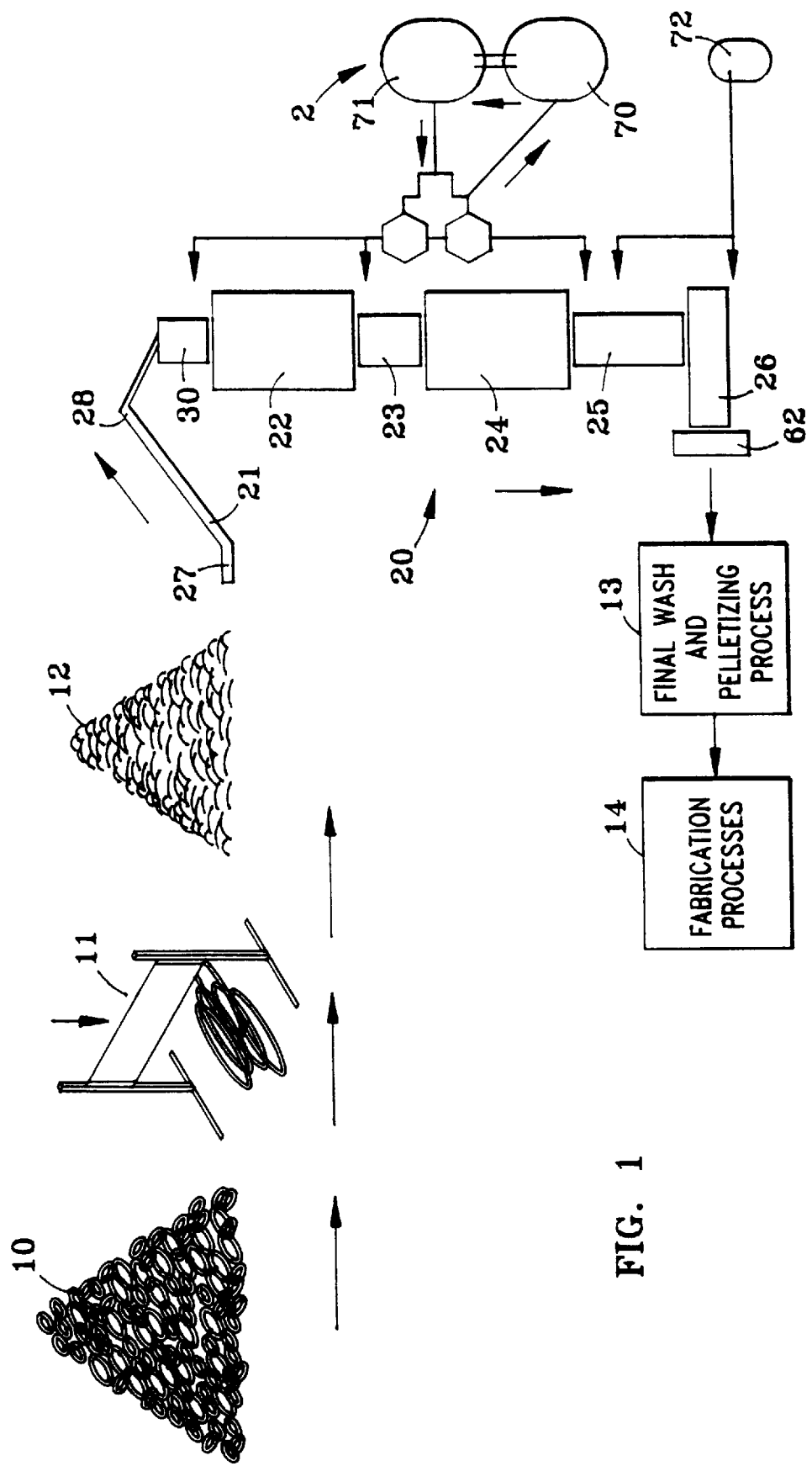
FIG. 1 is a schematic overview of a process for recycling polymer tubing according to the present invention.

A process for recycling polymer tubing 10 contaminated with large amounts of organic matter, soil, and so forth is shown in FIG. 1. The polymer tubing 10 to be recycled is delivered to the recycling plant in roll form or loose tubing. The polymer tubing 10 is typically contaminated with up to 60% by weight of organic matter, soil, and so forth. A skid-steer loader or the like is preferably used to handle the rolls of tubing 10, which typically weigh 300 to 500 pounds each. The polymer tubing 10, which is typically an LDPE film with gauge between 0.005 and 0.015, is then reduced to an acceptable size by either splitting the rolls of tubing using a guillotine 11 or shredding the tubing with a suitable shredder device. The split or shredded tubing is then placed in a pile 12 where it awaits further processing.

The next step in the recycling process according to the present invention is to pass the contaminated polymer tubing 10 through a pre-wash process 20. The pre-wash process 20 includes a series of washing and rinsing subprocesses that remove most of the contaminants from the polymer tubing 10. The level of contamination of the polymer tubing 10 after passing through the pre-wash process 20 is preferably less than 5% by weight. The pre-washed tubing 10 is then passed through a final wash and pelletizing process 13 to convert the tubing into a pelletized polymer material. The pelletized material is then passed through suitable fabrication processes 14 for making new tubing or other polymer products in a known manner.

Figure 2A:
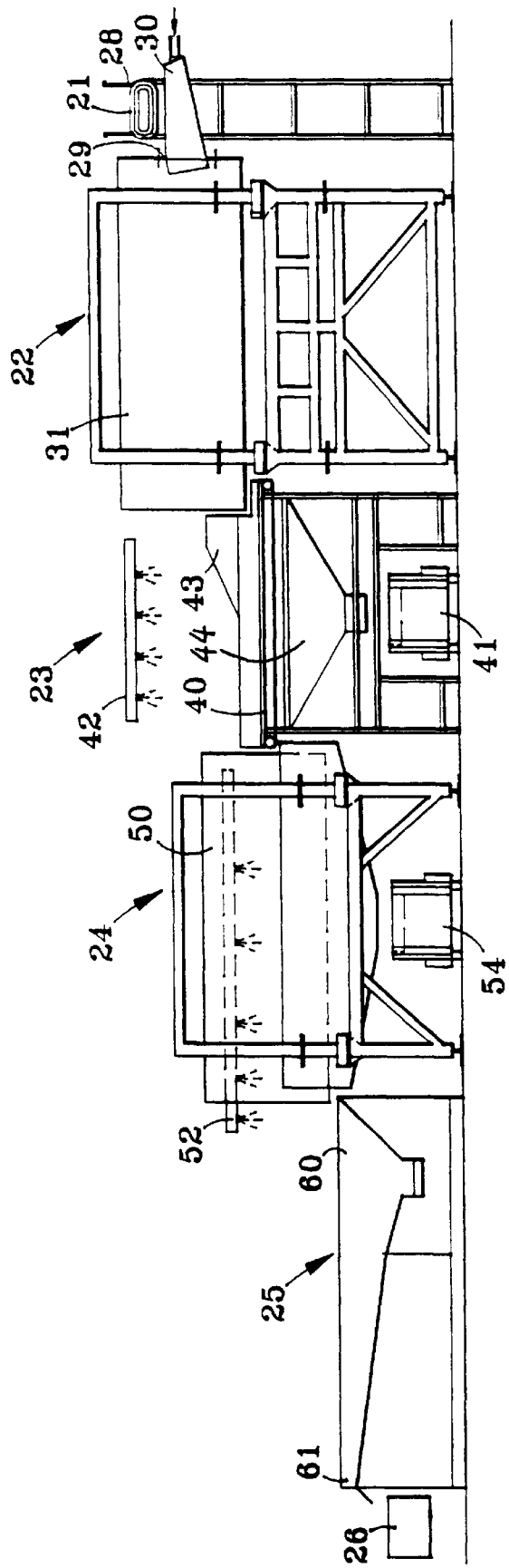
FIG. 2A is a side view of a pre-wash apparatus for washing polymer tubing before the tubing enters a final wash and pelletizing process.
Figure 2B:
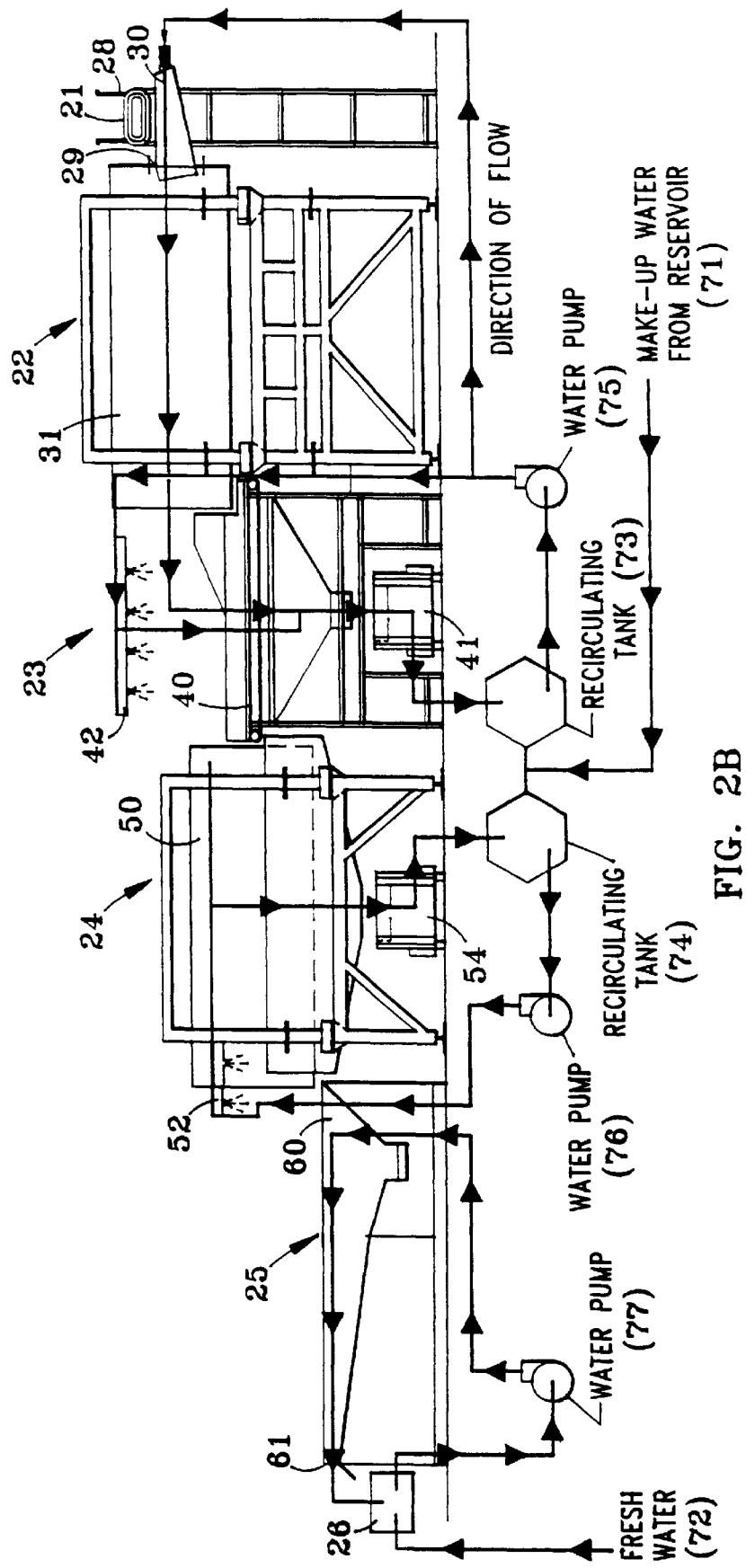
FIG. 2B shows the pre-wash apparatus of FIG. 2A along with a schematic diagram of the fluid flow through the apparatus.
Figure 3:
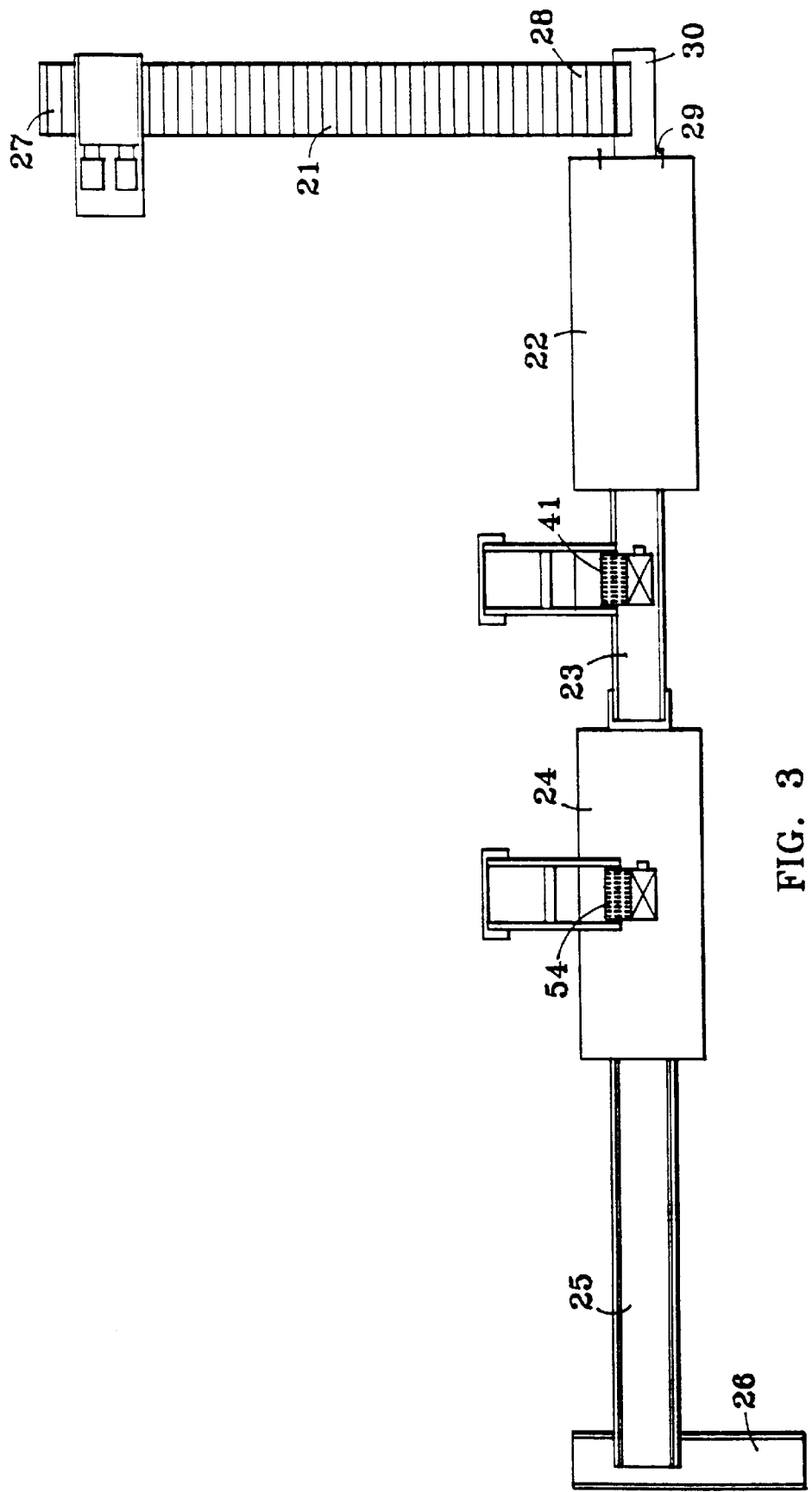
FIG. 3 is a plan view of the pre-wash apparatus shown in FIG. 2A.

The pre-wash system 20 according to the present invention is shown in side view in FIG. 2 and in plan view in FIG. 3. The main components of the pre-wash system 20 are a first variable speed conveyor 21, a first rotating wash trommel 22, a second variable speed conveyor 23, a second rotating perforated rinse trommel 24, a float/sink tank 25, and a third conveyor 26. As shown in FIG. 1, the contaminated polymer material 10 is introduced to the pre-wash system 20 on the first variable speed conveyor 21 and discharged from the pre-wash system 20 on the third conveyor 26.

The contaminated polymer material 10 is placed on the first variable speed conveyor 21 after it has been reduced into an acceptable size by the guillotine 11 or other suitable device. The design of all three conveyors 21, 23, 26 allow fluids and contaminants separated from the polymer material to readily pass through the conveyors. The first conveyor 21 travels at an inclined angle (e.g., 40 feet at a 25 degree pitch) from a loading point 27 where the contaminated polymer material is placed on the first conveyor 21, to a discharge point 28 adjacent the entrance 29 of the first wash trommel 22. The contaminated polymer material falls from the first conveyor 21 into a trough 30 along with a continuous flow of fluid (e.g., 200 to 300 gallons per minute) pumping across the bottom of the trough 30. The polymer material and fluid are discharged from the trough 30 into the entrance 29 of the first wash trommel 22. The trough 30 allows the polymer material to enter on the first conveyor 21 from one direction and exit on the trough 30 at a 90 degree angle into the wash trommel 22. The wash fluid flowing across the bottom of the trough 30 also enters the wash trommel 22 at this point.

Figure 6:
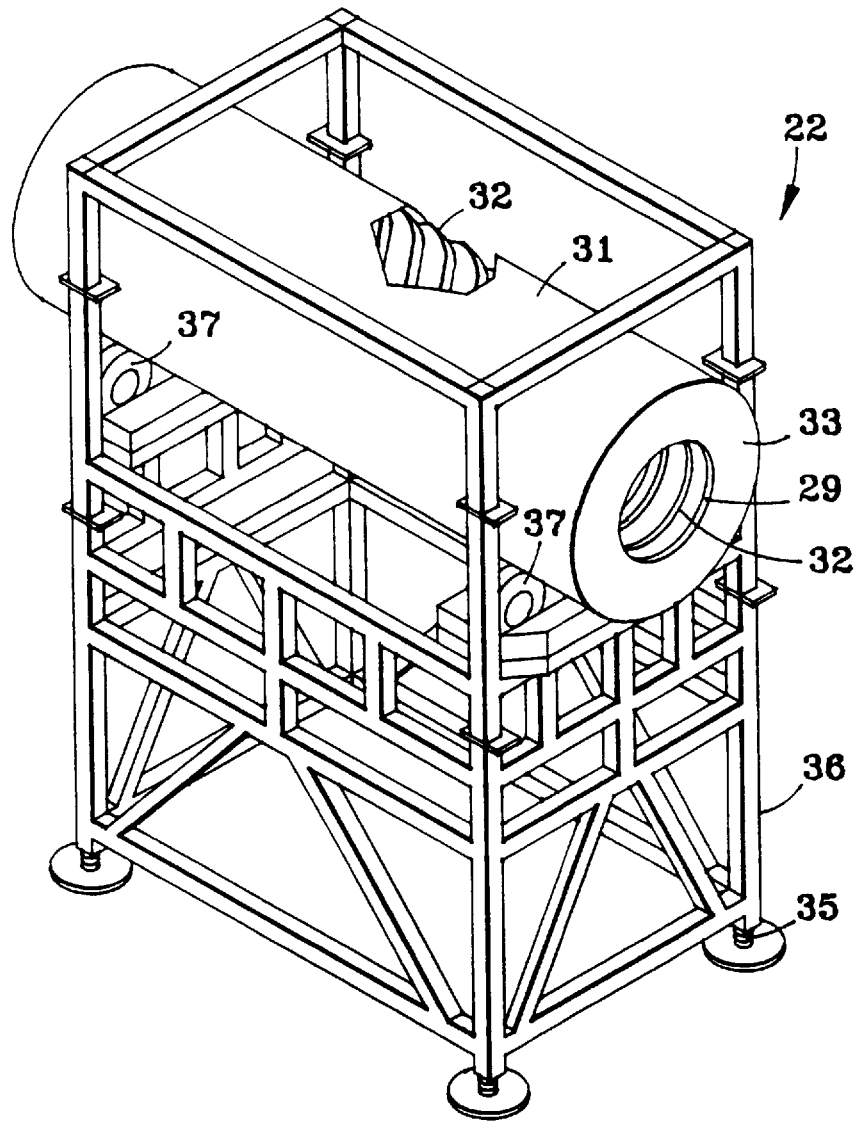
FIG. 6 is a perspective view of the wash trommel shown in FIGS. 4 and 5.

The wash trommel 22 is shown in detail in FIGS. 4 to 6. Once inside the wash trommel 22, the polymer material 10 is subjected to an intense rolling action with agitation. The wash trommel 22 includes a large cylinder 31 which is rotated, preferably at about 3 to 4 revolutions per minute, and has helical flighting 32 throughout its interior to create a corkscrew effect. The entrance 29 of the cylinder 31 is defined by a lip 33 which prevents wash fluid from flowing out the entrance end of the cylinder 31. The polymer material preferably spends approximately 5 to 7 minutes moving from the entrance 29 of the wash trommel 22 to a discharge end 34. The polymer material and fluid exit the wash trommel 22 from the discharge end 34 of the cylinder 31 onto the second variable speed conveyor 23. The discharge end 34 of the cylinder 31 is open (without a lip) to permit the wash fluid to flow out.

The cylinder 31 of the wash trommel 22 is preferably supported in a generally level position or a position that is slightly inclined toward the discharge end 34. Since the cylinder 31 is partially closed at the entrance 29 by the lip 33, the wash fluid will exit out of the discharge end 34, even if the cylinder 31 is not inclined in that direction. Adjustment members 35 are provided on the bottom of the legs of the support structure 36 of the wash trommel 22 to permit adjustment of the angle of inclination of the cylinder 31. Other suitable adjustment means may be used instead of the threaded adjustment members 35, which are provided by way of example only. A proper angle and rotation speed of the cylinder 31 will optimize the flow of the polymer material together with the wash fluid through the wash trommel 22.

The cylinder 31 is supported for rotation by roller members 37 that engage an outside surface of the cylinder 31. A motor 38 or other suitable drive means is provided to rotatably drive the cylinder 31. The support structure 36 for the cylinder 31 of the wash trommel 22 is tall enough to elevate the cylinder 31 to a position where the polymer material, along with the wash and rinse fluids, can exit the wash trommel 22 and progress downstream through the remaining pre-wash system 20 in a generally downward direction.

The second conveyor 23 is preferably about 10 feet long and formed of an endless moving chain mesh 40 or other suitable open structure. The second conveyor 23 allows the wash water and contaminants to pass through and across a linear motion shaker screen 41, where the wash water is filtered and recirculated to the trough 30 at the entrance of the first wash trommel 22. Once the polymer material is on the second conveyor 23, it travels generally horizontally under a spray bar 42. The spray bar 42 constantly showers the polymer material with water or other suitable fluid to rinse additional contaminants from the polymer material. The sprayed water passes through the endless chain mesh 40 of the second conveyor 23 and down across the same linear motion shaker screen 41 that the wash water passes across. The trash and other contaminants separated from the polymer material by the linear motion shaker screen 41 are set aside for proper disposal in a landfill.

The second conveyor 23 has raised sides 43 that prevent the polymer material and fluid from falling off to the side of the endless chain mesh 40. A funnel-shaped structure 44 is provided between the endless chain mesh 40 and the linear motion shaker screen 41 to guide the fluid and contaminants passing through the endless chain mesh 40 to the linear motion shaker screen 41. The polymer material is passed from the second conveyor 23 into an entrance end 58 of a rotating cylinder 50 of the perforated rinse trommel 24.

Figure 8:
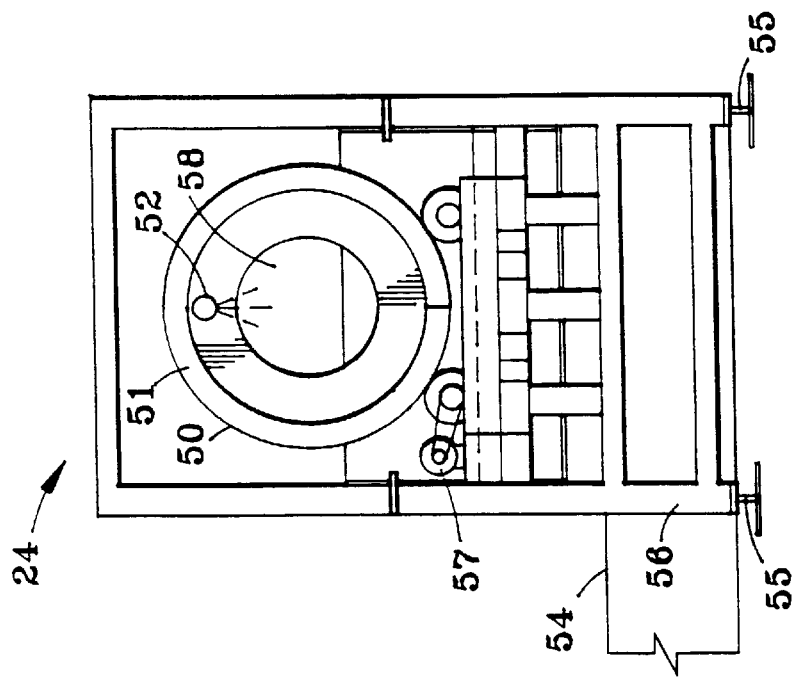
FIG. 8 is an end view of the perforated rinse trommel taken along line 8—8 in FIG. 7.
Figure 7:
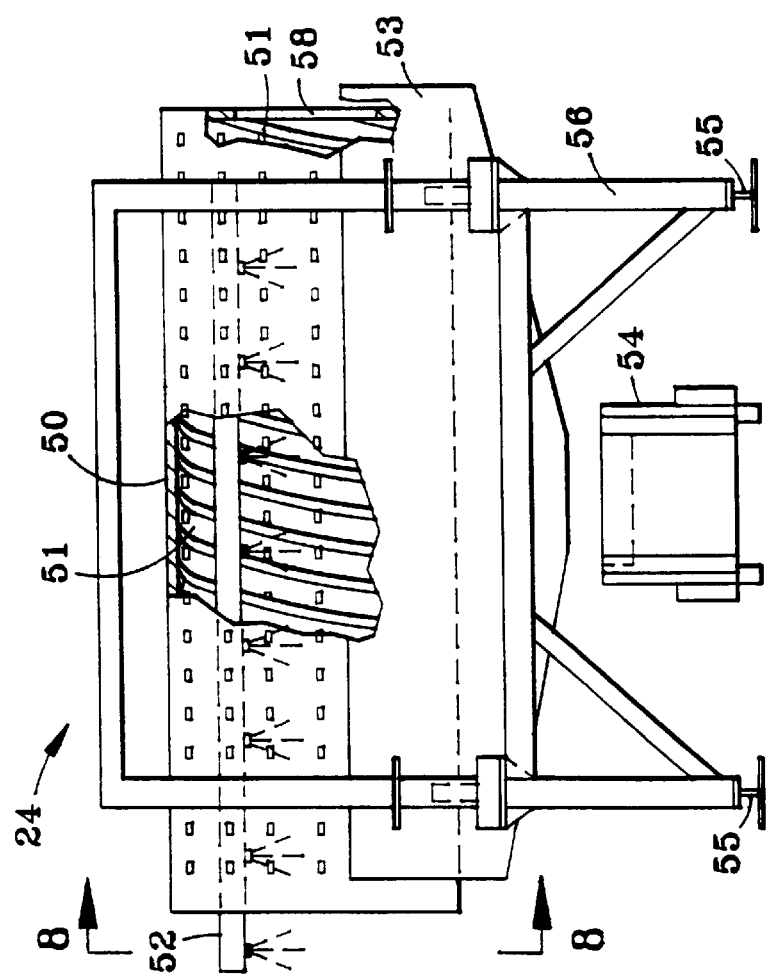
FIG. 7 is a side view of a perforated rinse trommel for use in the pre-wash apparatus of the present invention.
Figure 9:
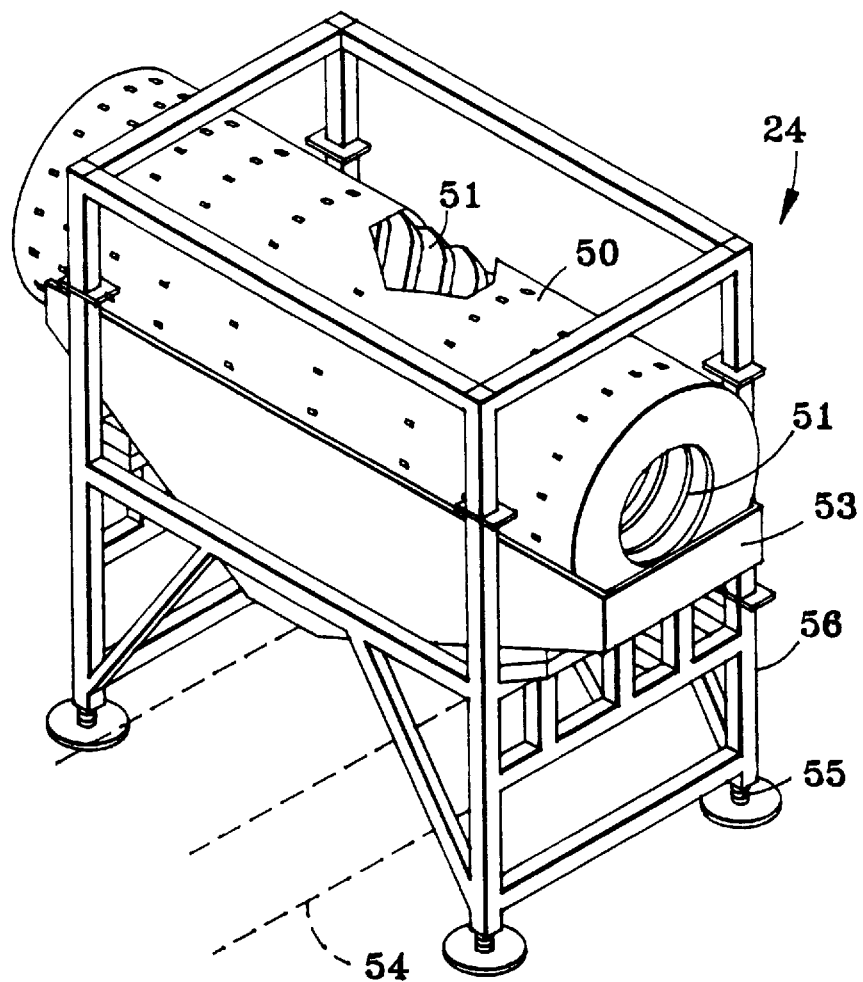
FIG. 9 is a perspective view of the perforated rinse trommel shown in FIGS. 7 and 8.

The perforated rinse trommel 24 is shown in detail in FIGS. 7 to 9. The perforated rinse trommel 24 is similar to the wash trommel 22, except that the rotating cylinder 50 of the rinse trommel 24 has perforations covering a majority of its surface. The perforations are may be 1½" by ¾ perforations, for example, that cover approximately 70% of the surface of the cylinder 50 of the rinse trommel 24. A motor 57 or other suitable drive means is provided to rotatably drive the cylinder 50.

Inside the cylinder 50 of the perforated rinse trommel 24, the polymer material is subjected to intense rolling and agitation by a helical flighting 51, similar to that induced by the first wash trommel 22. Fluid is introduced into the perforated rinse trommel 24 by a spray bar 52 that extends within the rinse trommel 24 over at least part of the length of the rinse trommel 24. The spray bar 52 can be, for example, a PVC pipe with nozzles or holes spaced along its length. The spray bar 52 preferably delivers approximately 200 to 500 gpm of fluid into the perforated rinse trommel 24. This enables additional organic matter to be rinsed off the polymer material and out through the perforations in the rinse trommel 24.

A funnel-shaped structure 53 is provided under and about the lower portion of the cylinder 50 to recover the fluid and contaminants passing through the perforations in the cylinder 50 of the rinse trommel 24. The recovered fluid and contaminants are directed across a linear motion shaker screen 54 where the fluid is filtered and recirculated. The trash and other contaminants separated from the polymer material by the linear motion shaker screen 54 are set aside for proper disposal in a landfill.

The cylinder 50 of the rinse trommel 24 is supported at a lower elevation than the cylinder 31 of the wash trommel 22 so that the polymer material 10 continues to flow downstream through the pre-wash system 20 in a generally downward direction. Adjustment members 55 are provided on the bottom of the legs of the support structure 56 of the rinse trommel 24 to permit adjustment of the angle of inclination of the perforated cylinder 50. Other suitable adjustment means may be used instead of the threaded adjustment members 55, which are provided by way of example only. A proper angle and rotation speed of the cylinder 50 will optimize the flow of the polymer material together with the rinse fluid through the rinse trommel 24. The polymer material preferably spends approximately 5 to 7 minutes moving from the entrance 58 of the rinse trommel 24 to a discharge end thereof.

After traveling through the perforated rinse trommel 24, the polymer material falls into the float/sink tank 25. Water is circulated through the float/sink tank 25 from an entrance end 60 to overflow at a discharge end 61. The flow of water through the float/sink tank 25 is created by a water line in the entrance end 60 that is directed to force water toward the discharge end 61. This flow of water allows the polymer material to gently float through the float/sink tank 25 while heavy contaminants sink to the bottom of the tank. The heavy contaminants separated from the polymer material by the float/sink tank 25 are removed from the tank daily for proper disposal in a landfill.

At the end of the float/sink tank 25, the polymer material falls onto the third conveyor 26 along with the water flowing through the tank 25. The third conveyor 26 includes an endless moving chain mesh that permits fluid and contaminants to pass through while the polymer material 10 is conveyed to the end of the pre-wash system 20. The float/sink tank 25 in conjunction with the third conveyor 26 provides the polymer material 10 with a final rinse. The third conveyor 26 discharges the polymer material 10 into a basket container 62 which can be carried by a forklift or the like for transporting the polymer material to a storage pile or directly into the final wash and pelletizing process 13. The water is recovered beneath the third conveyor 26 and recirculated to the float/sink tank 25.

The wash fluid and the rinse fluid are preferably changed daily by pumping the contaminated fluids to the first stage 70 of a two stage reservoir (FIG. 1) and replacing the fluids with fresh fluids from the second stage 71 of the reservoir. The reservoir allows heavy contaminants to sink out of the water and enhances the efficiency of the pre-wash process by minimizing the use of fresh make-up water. The final rinse provided by the float/sink tank 25 and third conveyor 26 uses fresh water from a suitable fresh water source 72 so as to enhance the final rinse.

Referring to FIG. 2B, a flow of fluid through the pre-wash apparatus will be described in further detail. As shown in FIG. 2B, the second stage 71 of the two stage reservoir provides make-up water for the wash trommel 22, the second conveyor 23, and the rinse trommel 24, while the fresh water source 72 provides make-up water for the float/sink tank 25 and the third conveyor 26.

Make-up water from the reservoir 71 is introduced into one or more recirculating tanks 73 and 74 adjacent to the second conveyor 23 and the rinse trommel 24. Water is pumped from the recirculating tank 73 by a suitable water pump 75 into the trough 30. The water passes through the trough 30 into the wash trommel 22. The "wash" water then passes through the wash trommel 22 and is discharged onto the second conveyor 23. The wash water passes through the second conveyor 23 and is guided by the funnel-shaped structure 44 onto the linear motion shaker screen 41. The wash water then passes through the linear motion shaker screen 41 and back into the recirculating tank 73.

The water pump 75 also supplies water to the spray bar 42 positioned over the second conveyor 23, which water then passes through the second conveyor 23 onto the linear motion shaker screen 41 and back into the recirculating tank 73 along with the wash water from the wash trommel 22.

A second water pump 76 pumps water from the recirculating tank 74 into the spray bar 52 extending into the rinse trommel 24. The water discharged from the spray bar 52 passes through the perforated cylinder 50 of the rinse trommel 24 and is guided onto the linear motion shaker screen 54 by the funnel-shaped structure 53. The water then passes through the linear motion shaker screen 54 and back into the recirculating tank 74.

Thus, the recirculating tank 73 receives make-up water from the two stage reservoir 71 and discharge water from the linear motion shaker screen 41, while the recirculating tank 74 receives make-up water from the two stage reservoir 71 and discharge water from the linear motion shaker screen 54.

The third conveyor 26 receives water from the fresh water source 72 to provide a final rinse of the polymer material. This water passes through the third conveyor 26 and is recirculated by a water pump 77 to the entrance end 60 of the float/sink tank 25. The water flows through the float/sink tank and is discharged onto the third conveyor 26 where it is again recirculated back to the water pump 77 and the entrance end 60 of the float/sink tank 25.

The pre-wash process according to the present invention conserves natural resources by recycling wash water and rinse water continuously during operation, limiting the use of fresh make-up water, permitting proper disposal of contaminants, and most importantly, making it possible to recycle contaminated polymer materials that were previously considered unrecoverable.

The pre-washed polymer material leaving the pre-wash system 20 is fed into the final wash and pelletizing process 13 where it is shredded into small particles and run through a small float/sink tank. The shredded polymer material is then placed in a slurry tank, washed in cold water, spun out, and then forwarded into a hot water wash. There is very little waste or contamination at this point. The washed polymer material is then run through a hot air drying process before entering the remaining stages of the blending and pelletizing process to produce industrial grade polymer pellets.

The term "fluid" has been used throughout this application to describe wash water and rinse water in the pre-wash process. While the preferred fluid for this process is water, other suitable fluids or detergents can be used if desired.

It will be appreciated that the present invention is not limited to the exact construction that has been described above and illustrated in the accompanying drawings, and that various modifications and changes can be made without departing from the scope and spirit thereof. It is therefore intended that the scope of the invention only be limited by the appended claims.

The invention claimed is:

1. A pre-wash apparatus for recycling heavily contaminated polymer tubing, comprising:
   a wash trommel having a generally horizontal axis of rotation and a helical flighting on an inside surface thereof;
   a rinse trommel having a generally horizontal axis of rotation and a helical flighting on an inside surface thereof, said rinse trommel having a perforated wall surface that allows rinse fluid and contaminants to pass therethrough;
   a conveyor positioned between a discharge end of the wash trommel and an entrance end of the rinse trommel for conveying the polymer tubing from the wash trommel to the rinse trommel;
   a first open mesh conveyor for conveying the polymer tubing from a loading point to an entrance end of the wash trommel; and
   a trough positioned between a discharge end of the first open mesh conveyor and the entrance end of the wash trommel, said trough having a continuous flow of wash fluid flowing therethrough for conveying the polymer tubing along with the wash fluid into the entrance end of the wash trommel.

2. The pre-wash apparatus according to claim 1, further comprising a means for sizing the polymer tubing into small pieces before introducing the polymer tubing into the wash trommel.

3. The pre-wash apparatus according to claim 2, comprising:
   wherein said conveyor positioned between the wash trommel and the rinse trommel comprises a second open mesh conveyor, and further comprising:
   a first spray bar positioned above said second open mesh conveyor for spraying a pre-rinse fluid over the polymer tubing;

a first funnel-shaped structure positioned below said second open mesh conveyor for guiding fluid and contaminants passing through said second open mesh conveyor to a first separating means for separating the contaminants from the fluid;

a first means for recirculating the fluid passing through the first separating means;

a second spray bar extending into said rinse trommel for spraying rinse fluid over the polymer tubing within said rinse trommel;

a second funnel-shaped structure positioned below said rinse trommel for guiding fluid and contaminants passing through said perforated wall surface of the rinse trommel to a second separating means for separating the contaminants from the fluid;

a second means for recirculating the fluid passing through the second separating means;

a float/sink tank having an entrance end adjacent to a discharge end of said rinse trommel, said float/sink tank having a fluid level therein sufficient to permit the polymer tubing to float from the entrance end of the tank to a point downstream from the entrance end thereof while permitting contaminants separated from the polymer tubing to sink to a bottom of the tank;

a third open mesh conveyor positioned downstream from the entrance end of the float/sink tank for conveying the polymer tubing away from the float/sink tank;

means for spraying a final rinse fluid onto the polymer tubing being conveyed on the third open mesh conveyor;

a third means for recirculating fluid passing through the third open mesh conveyor;

said first and second recirculating means together comprising at least one recirculating tank for receiving fluid from said first and second separating means; and a two stage reservoir in fluid communication with said at least one recirculating tank for receiving contaminated fluid from said recirculating tank.

4. The pre-wash apparatus according to claim 1, wherein the polymer tubing to be recycled comprises flexible tubing used for agricultural irrigation.

5. A pre-wash apparatus for recycling heavily contaminated polymer tubing, comprising;

a wash trommel having a generally horizontal axis of rotation and a helical flighting on an inside surface thereof;

a rinse trommel having a generally horizontal axis of rotation and a helical flighting on an inside surface thereof, said rinse trommel having a perforated wall surface that allows rinse fluid and contaminants to pass therethrough;

a conveyor positioned between a discharge end of the wash trommel and an entrance end of the rinse trommel for conveying the polymer tubing from the wash trommel to the rinse trommel; and a float/sink tank having an entrance end adjacent to a point downstream from the entrance end of said rinse trommel, said float/sink tank having a fluid level therein sufficient to permit polymer tubing to float from the entrance end of the tank to a discharge portion thereof while permitting contaminants separated from the polymer tubing to sink to a bottom of the tank.

6. The pre-wash apparatus according to claim 5, further comprising a third open mesh conveyor positioned downstream from the entrance end of the float/sink tank for conveying the polymer tubing away from the float/sink tank.

7. The pre-wash apparatus according to claim 6, further comprising a means for spraying a final rinse fluid onto the polymer tubing being conveyed on the third open mesh conveyor, and third means for recirculating fluid passing through the third open mesh conveyor back into the entrance end of the float/sink tank.

8. A pre-wash apparatus for recycling heavily contaminated polymer tubing, comprising:

a wash trommel having a generally horizontal axis of rotation and a helical flighting on an inside surface thereof;

a rinse trommel having a generally horizontal axis of rotation and a helical flighting on an inside surface thereof, said rinse trommel having a perforated wall surface that allows rinse fluid and contaminants to pass therethrough;

a conveyor positioned between a discharge end of the wash trommel and an entrance end of the rinse trommel for conveying the polymer tubing from the wash trommel to the rinse trommel; and a second funnel-shaped structure positioned below said rinse trommel for guiding fluid and contaminants passing through said perforated wall surface of the rinse trommel to a second separating means for separating the contaminants from the fluid.

9. The pre-wash apparatus according to claim 8, further comprising a second spray bar extending into said rinse trommel for spraying rinse fluid over the polymer tubing within said rinse trommel.

10. The pre-wash apparatus according to claim 9, further comprising a second means for recirculating the fluid passing through the second separating means back through the second spray bar and into the rinse trommel.

11. A pre-wash apparatus for recycling heavily contaminated polymer tubing, comprising:

a wash trommel having a generally horizontal axis of rotation and a helical flighting on an inside surface thereof;

a rinse trommel having a generally horizontal axis of rotation and a helical flighting on an inside surface thereof, said rinse trommel having a perforated wall surface that allows rinse fluid and contaminants to pass therethrough; and a conveyor positioned between a discharge end of the wash trommel and an entrance end of the rinse trommel for conveying the polymer tubing from the wash trommel to the rinse trommel;

wherein said conveyor positioned between the wash trommel and the rinse trommel comprises a second open mesh conveyor;

further comprising a first spray bar positioned above said second open mesh conveyor for spraying a pre-rinse fluid over the polymer tubing.

12. The pre-wash apparatus according to claim 11, further comprising a first funnel-shaped structure positioned below said second open mesh conveyor for guiding fluid and contaminants passing through said second open mesh conveyor to a first separating means for separating the contaminants from the fluid.

13. The pre-wash apparatus according to claim 11, further comprising a first means for recirculating the fluid passing through the first separating means.

* * * * *